United States Patent
Medeiros De Amorim et al.

(10) Patent No.: US 12,382,411 B2
(45) Date of Patent: Aug. 5, 2025

(54) TIMING ADVANCE RANGE EXTENSION IN RANDOM ACCESS RESPONSE

(71) Applicant: NOKIA TECHNOLOGIES OY, Espoo (FI)

(72) Inventors: Raphael Medeiros De Amorim, Aalborg (DK); István Zsolt Kovács, Aalborg (DK); Karri Markus Ranta-Aho, Espoo (FI); Jeroen Wigard, Klarup (DK); Mads Lauridsen, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 474 days.

(21) Appl. No.: 17/775,441

(22) PCT Filed: Oct. 19, 2020

(86) PCT No.: PCT/EP2020/079394
§ 371 (c)(1),
(2) Date: May 9, 2022

(87) PCT Pub. No.: WO2021/089314
PCT Pub. Date: May 14, 2021

(65) Prior Publication Data
US 2022/0386382 A1 Dec. 1, 2022

Related U.S. Application Data

(60) Provisional application No. 62/932,139, filed on Nov. 7, 2019.

(51) Int. Cl.
*H04W 74/0833* (2024.01)
*H04W 56/00* (2009.01)
*H04W 74/08* (2009.01)

(52) U.S. Cl.
CPC ... *H04W 74/0833* (2013.01); *H04W 56/0045* (2013.01); *H04W 74/0891* (2013.01)

(58) Field of Classification Search
CPC ......... H04W 74/0833; H04W 56/0045; H04W 74/0891; H04B 7/18513
See application file for complete search history.

(56) References Cited

U.S. PATENT DOCUMENTS

2022/0377780 A1 * 11/2022 Khoshkholgh Dashtaki ............... H04W 72/21

FOREIGN PATENT DOCUMENTS

WO   WO-2019195457 A1 * 10/2019 ......... H04B 7/18504
WO   WO-2020191762 A1 * 10/2020

OTHER PUBLICATIONS

International Search Report and Written Opinion dated Feb. 15, 2021 corresponding to International Patent Application No. PCT/EP2020/079394.

(Continued)

*Primary Examiner* — Mohammad S Adhami
*Assistant Examiner* — Samuel Dilan Rutnam
(74) *Attorney, Agent, or Firm* — Barta Jones, PLLC

(57) ABSTRACT

A method may include sending, by a user equipment, a random access preamble message to a network element. The method may also include receiving an uplink grant in a random access response message in response to the random access preamble message. The method may further include adding an implicit timing advance offset to an uplink time domain resource allocation of the uplink grant to establish synchronization of radio transmissions between the user equipment and the network element. The method may also include transmitting a scheduled transmission message including the implicit timing advance offset to the network element. Further, the implicit timing advance offset may be (Continued)

added to the uplink time domain resource before the scheduled transmission message is transmitted.

17 Claims, 10 Drawing Sheets

(56) References Cited

OTHER PUBLICATIONS

3GPP TS 38.214 V15.7.0 (Sep. 2019), Technical Specification, 3rd Generation Partnership Project; Technical Specification Group Radio Access Network; NR; Physical layer procedures for data (Release 15), Sep. 2019.
3GPP TR 38.821 V0.8.0 (Sep. 2019), Technical Report, 3rd Generation Partnership Project; Technical Specification Group Radio Access Network; Solutions for NR to support non-terrestrial networks (NTN) (Release 16) Sep. 2019.
3GPP TS 38.321 V15.7.0 (Sep. 2019), Technical Specification, 3rd Generation Partnership Project; Technical Specification Group Radio Access Network; NR; Medium Access Control (MAC) protocol specification (Release 15) Sep. 2019.
3GPP TS 38.300 V15.7.0 (Sep. 2019), Technical Specification, 3rd Generation Partnership Project; Technical Specification Group Radio Access Network; NR; NR and NG-RAN Overall Description; Stage 2 (Release 15), Sep. 2019.
3GPP TS 38.213 V15.7.0 (Sep. 2019), Technical Specification, 3rd Generation Partnership Project; Technical Specification Group Radio Access Network; NR; Physical layer procedures for control (Release 15), Sep. 2019.
3GPP TS 38.212 V15.7.0 (Sep. 2019), Technical Specification, 3rd Generation Partnership Project; Technical Specification Group Radio Access Network; NR; Multiplexing and channel coding (Release 15), Sep. 2019.
3GPP TS 38.331 V15.7.0 (Sep. 2019), Technical Specification, 3rd Generation Partnership Project; Technical Specification Group Radio Access Network; NR; Radio Resource Control (RRC) protocol specification (Release 15), Sep. 2019.
Oppo, "Discussion on timing advance in NTN RACH," 3GPP Draft; R2-1909753, 3GPP TSG-RAN WG2 Meeting #107, Prague, Czech, Aug. 26-30, 2019, Aug. 16, 2019, XP051767548.
Ad-hoc Chair (Ericsson), "Chairman's notes of AI 7.2.5 Study on Solutions for NR to Support Non-Terrestrial Network (NTN)," 3GPP Draft; R1-1911510, 3GPP TSG-RAN WG1 Meeting #98bis, Chongqing, China, Oct. 14-20, 2019, Oct. 22, 2019, XP051798775.
Nokia et al., "Doppler Compensation, Uplink Timing Advance, Random Access and UE Location in NTN," 3GPP Draft; R1-1911220, 3GPP TSG RAN WG1 Meeting #98bis, Chongqing, China, Oct. 14-20, 2019, Oct. 5, 2019, XP051789991.
3GPP TS 38.212 V15.7.0 (Sep. 2019), 3rd Generation Partership Project; Technical Specification Group Radio Access Network; NR; Multiplexing and Channel Coding (Release 15), 3GPP, 5G, 101 pages.
3GPP TS 38.213 V15.7.0 (Sep. 2019), 3rd Generation Partnership Project; Technical Specification Group Radio Access Network; NR; Physical Layer Procedures for Control (Release 15), 3GPP, 5G, 108 pages.
3GPP TS 38.214 V15.7.0 (Sep. 2019), 3rd Generation Partnership Project; Technical Specification Group Radio Access Network; NR; Physical Layer Procedures for Data (Release 15), 3GPP, 5G, 106 pages.
3GPP TS 38.300 V15.7.0 (Sep. 2019), 3rd Generation Partnership Project; Technical Specification Group Radio Access Network; NR; NR and NG-RAN Overall Description; Stage 2 (Release 15), 3GPP, 5G, 99 pages.
3GPP TS 38.321 V15.7.0 (Sep. 2019), 3rd Generation Partnership Project; Technical Specification Group Radio Access Network; NR; Medium Access Control (MAC) Protocol Specification (Release 15), 3GPP, 5G, 78 pages.
3GPP TS 38.331 V15.7.0 (Sep. 2019), 3rd Generation Partnership Project; Technical Speicifcation Group Radio Access Network; NR; Radio Resource Control (RRC) Protocol Specification (Release 15), 3GPP, 5G, 527 pages.
3GPP TR 38.821 V0.8.0 (Sep. 2019), 3rd Generation Partnership Project; Technical Specification Group Radio Access Network; Solutions for NR to support non-terrestrial networks (NTN) (Release 16); 3GPP, 5G, 92 pages.
European Office Action issued in corresponding European Patent Application No. 20 793 360.7-1206 on Feb. 21, 2023.

\* cited by examiner

| | | | | | | | |
|---|---|---|---|---|---|---|---|
| R | Timing Advance Command | | | | | | Oct 1 |
| Timing Advance Command | | | | UL Grant | | | Oct 2 |
| UL Grant | | | | | | | Oct 3 |
| UL Grant | | | | | | | Oct 4 |
| UL Grant | | | | | | | Oct 5 |
| Temporary C-RNTI | | | | | | | Oct 6 |
| Temporary C-RNTI | | | | | | | Oct 7 |

FIG. 4

TIMING ADVANCE RANGE EXTENSION IN RANDOM ACCESS RESPONSE

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for timing advance (TA) range extension in a random access response (RAR).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein:

FIG. 4 illustrates an example of a format of a RAR message in NR.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for timing advance (TA) range extension in a random access response (RAR).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments may relate to the area of cellular radio communications on the scope of non-terrestrial networks (NTN). Implementations of certain NTN solutions have been envisioned by $3^{rd}$ Generation Partnership (3GPP) systems, such as 5G New Radio (NR). For instance, 3GPP has identified certain solutions that may enable 5G NR to support the usage of NTN within the context of cellular networks in an effort to provide seamless coverage on remote areas (e.g., deserts, islands, and the open ocean), and/or in disaster situations. This may be done by utilizing satellites carrying the gNB in 5G networks.

Figure 1:
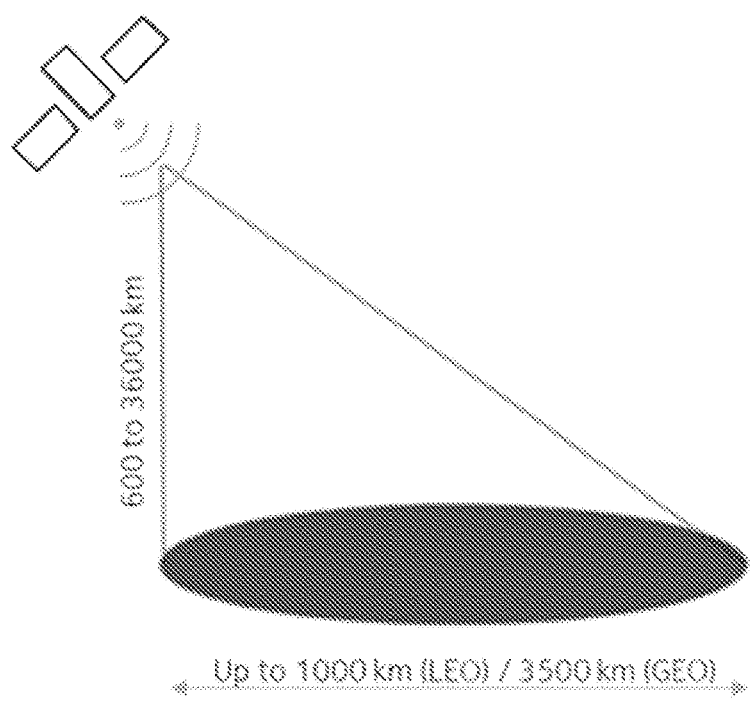
FIG. 1, which illustrates an example of a 3GPP non-terrestrial network scenario.

FIG. 1 illustrates an example of a 3GPP NTN scenario. For instance, the radio propagation delay between the user equipment (UE) and gNB may be substantially longer, as compared to a terrestrial network. In addition, the differential delay may define the difference in the radio propagation delay value at the two edges of the coverage area. As illustrated in FIG. 1, the delay may be due to corresponding geometrical distances to the satellite.

In radio access management, certain example embodiments may relate to the timing advance (TA) commands sent by network nodes to the UE to align the reception time of the uplink (UL) transmissions of all UEs. In an example embodiment, the TA may be used to compensate for the propagation delay between the UE and the gNB, τ.

Figure 2:
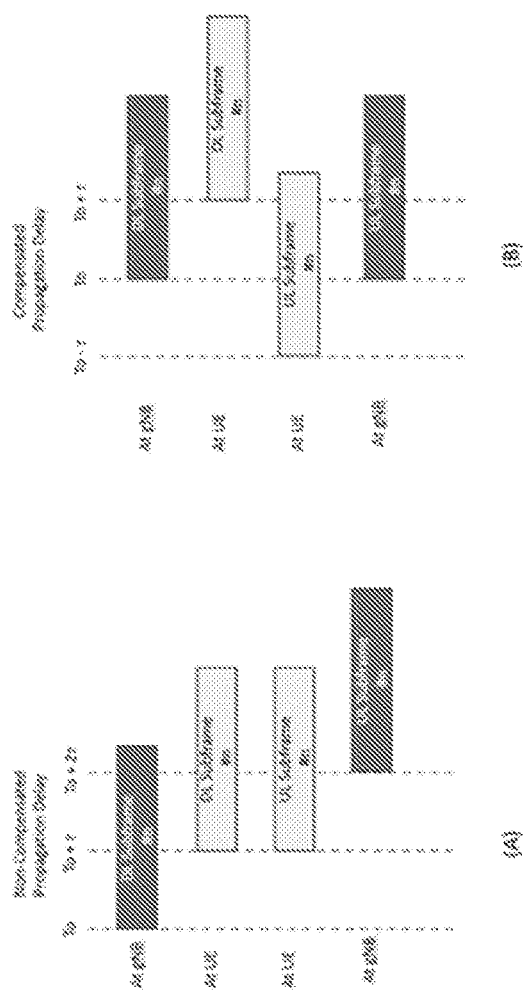
FIG. 2 illustrates an example comparison when there is no TA on the UE (A), and when there is TA (B).

FIG. 2 illustrates an example of a comparison when there is no TA on the UE (A), and when there is TA (B). In particular, FIG. 2 illustrates differences between a system without TA (A) and a system with TA (B) to compensate for a propagation delay of T. In an example embodiment, the TA operation may be executed to ensure that the propagation delay differences between different UEs are compensated so that it may be possible to time-multiplex different UEs without the tail of one UE's transmission to overlap with the start of another UE's transmission, as well as in an orthogonal frequency-division multiplexing (OFDM) system. In an OFDM system, the frequency-multiplexed UEs may be time-aligned so that they do not interfere with each other. According to another example embodiment, in a time division duplexing (TDD) scheme where the DL and UL alternate, the DL and UL frame boundaries may be aligned as illustrated in FIG. 2.

Figure 3:
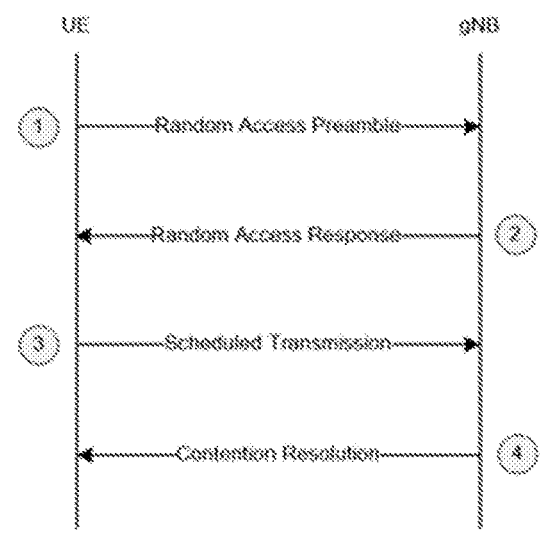
FIG. 3 illustrates an example of a contention-based random access response (RAR) procedure in new radio (NR).

FIG. 3 illustrates an example of a contention-based RAR procedure in NR. For instance, in 3GPP LTE and NR, the initial TA adjustment may be performed by the network at the reception of the RAR (gNB→UE) command (MSG 2 in FIG. 3), which is sent in response to the UE's random access preamble transmission on the random access channel (RACH) as a part of the 4-step random access procedure. The complete random access procedure is illustrated in FIG. 3 where MSG 1 corresponds to a message sent by the UE to the gNB as a random access preamble. In response, the gNB may send MSG 2 as a random access response. At MSG 3, the UE may send a scheduled transmission to the gNB based on the random access response in MSG 2. The gNB may then send MSG 4 as a contention resolution to the UE. In addition, a 2-step random access procedure is also being considered in 3GPP 5G NR standardization. For instance, in one implementation, MSG 1 and MSG 4 may be combined and transmitted (MSG A) by the UE, and MSG 2 and MSG 4 may be combined and transmitted (MSG B) by the network.

FIG. 4 illustrates an example of a format of RAR MSG 2 in NR. In NR, the RAR message, which is the response from the network to a RACH access by the UE, may be a 7-octet message as illustrated in FIG. 4. In this message, there are 12 bits reserved for the TA command, which may admit indexes, $T_A$, between 0 and 3848. Upon reception of the TA command, the user may apply a TA in the UL connection that is equal to TA=$(T_A \cdot 16 \cdot 64/2^\mu)T_C$. In this equation, $T_C \approx 0.508$ ns is the NR system reference time unit, and $2^\mu$ is given by the subcarrier spacing (SCS), where SCS=$2^\mu \cdot 15$ [kHz].

Based on the definition described above, the maximum TA that may be compensated by the TA command in the RAR message, in 5G NR, is presented in Table 1.

TABLE 1

Maximum timing advance value in the RAR message

| Subcarrier spacing (SCS) configuration parameter, μ | SCS [kHz] | Max TA [ms] | Max UE-gNb distance compensated [km] |
|---|---|---|---|
| 0 | 15 | 2 | 300 |
| 1 | 30 | 1 | 150 |
| 2 | 60 | 0.5 | 75 |
| 3 | 120 | 0.25 | 37.5 |

Figure 5:
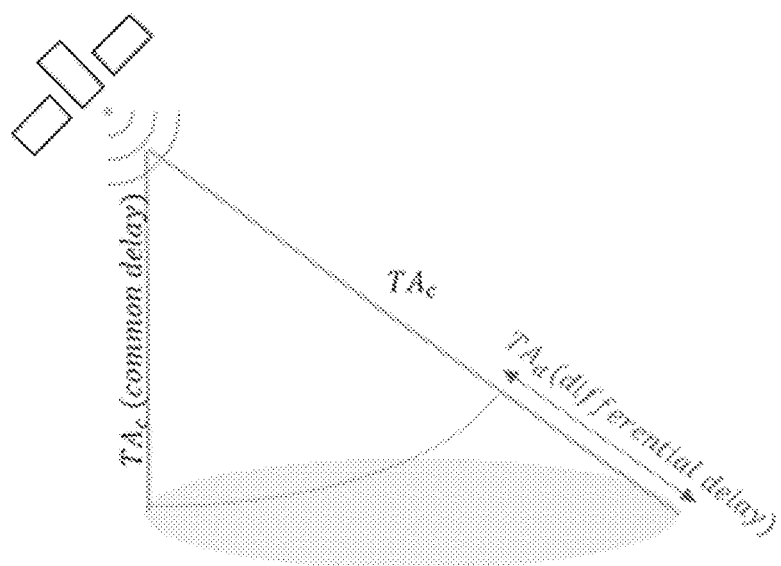
FIG. 5 illustrates an example of a common and differential delay from a user equipment perspective in a NTN cell.

As shown in Table 1, the values may present several challenges that may need to be addressed. For instance, the UE-gNB distances may be at least equal to 600 km (regenerative LEO satellite orbit altitude). In this scenario, the delay experienced by the UEs may be split into two parts: the common delay (experienced by all users due to the satellite distance to earth); and the differential delay. The differential delay may be defined as the delay difference between the total propagation delay due to the UE-gNB distance and the common delay value (minimum TA admitted by the gNB within a cell representing the smallest possible 2-way propagation delay in the cell). The split between common delay and differential delay is illustrated in FIG. 5. In particular, FIG. 5 illustrates an example of a common and differential delay from the UE perspective in a NTN cell.

Additionally, the common delay may be broadcast by the gNB to all the users, while the differential delay may be compensated individually by each UE. Thus, the UE-specific parameter may first be acquired in the RAR. In this case, the split into two values may entail that the common delay value may be broadcast, making it possible to allocate the required number of bits, while the smaller differential delay value may require less bits in the UE-specific RAR.

Another challenge with the values presented in Table 1 may involve cell sizes of NTN that support up to 3.2 ms (Low Earth Orbit (LEO) satellites), and 10 ms (Geostationary Earth Orbit (GEO) satellites) of differential delay in each NR cell (i.e., exceeding the max TA range limits of Table 1). This challenge may be magnified as the NTN study item (outcome reported in TR 38.821) consider deployments in S-band (2-4 GHz, i.e., frequency range 1, and, thus, SCS configuration parameter 0-2 may be applicable), as well as Ka-band (>20 GHz, i.e., frequency range 2, and, thus, only SCS 2-3 may be applicable). This may limit the maximum UE-gNB distance even further as shown in Table 1. Thus, even though the differential delay component of the TA compensation may be signaled in the RAR, the required values may still exceed the maximum limit.

According to certain example embodiments, it may be possible to resolve challenges that may result from the extension of the range of the differential TA. It may also be possible to compensate the individual value of TA that is signaled to the UEs to indicate the differential delay. In an example embodiment, the range of values for the differential TA ($TA_d$) in the RAR message may need to be extended to cover all possible user locations within a cell. If this is not achieved, the UE may not have full synchronization before sending MSG 3 in the random access. Thus, if the user is not considered to be synchronized, the user would not be allowed to perform any UL transmission, and therefore the connection would not be established, as MSG 3 cannot be sent by the user.

Table 2 below shows a known comparison between a TA step-size in the RAR message and the scaled step-size with the cyclic prefix duration. The scaled step-size may try to accommodate the maximum differential timing advance within the same bits of the original TA step-size. For instance, Table 2 shows how the scaled step-size becomes comparable to the cyclic prefix duration (or is even greater) when the maximum allowed differential delay (DD_max) is 3.2 ms. In Table 2, the timing advance values correspond to the differential delay component of the overall timing advance. As further shown in Table 2, the combination of common and differential delay are assumed such that the values of Table 2 are only used to compensate the differential delay. If the synchronization resolution of the UE increases above the cyclic prefix duration, significant time misalignments may result for the OFDM symbols at the gNB reception, causing high UL interference. As previously noted, it may be important for the maximum TA range to cover at least 2*DD_Max (round-trip differential delay). In addition, another solution for resolving this challenge may be to increase the number of bits in the RAR message associated with the TA command. However, this may require significant efforts in the 3GPP standards, as it may entail a design of a new RAR format.

TABLE 2

Timing Advance step-size in the RAR message and the scaled step-size (for a cell with 3.2 ms of maximum differential delay) compared with the cyclic prefix duration

| SCS | Step-size | (Normal) Cyclic Prefix Duration | Max. Timing Advance | Min. Scaling Factor Required | Scaled step-size. | New max. timing advance |
|---|---|---|---|---|---|---|
| 0 | 0.52 us | 4.69 us | 2 ms | 4 | 2.08 us | 8 ms |
| 1 | 0.26 us | 2.34 us | 1 ms | 8 | 2.08 us | 8 ms |
| 2 | 0.13 us | 1.17 us | 0.5 ms | 16 | 2.08 us | 8 ms |
| 3 | 0.065 us | 0.57 us | 0.25 ms | 32 | 2.08 us | 8 ms |

According to certain example embodiments, it may be possible to reduce the requirements for the $TA_d$ range to be signaled in the RAR by implicitly providing $TA_d$ offsets for the MSG 3 allocation provided in the UL time domain resource allocation in the UL grant in RAR (MSG 2). In certain example embodiments, the UE may add the implicit $TA_d$ to the $TA_d$ command received in RAR (MSG 2) before the UL transmission of MSG 3. As described herein, this may be accomplished by various means. However, additional solutions may be provided by other example embodiments.

In an example embodiment, implicit allocation of $TA_d$ offsets for the MSG 3 may be accomplished via a time/frequency dependent offset. Here, the RAR (MSG 2) provides an UL grant for MSG 3 (see FIG. 4), which includes 14 bits for frequency allocation (each indicating a different resource block group), and 4 bits for time allocation (see FIG. 4). In an example embodiment, each of the time and/or frequency allocation combinations, or a subgroup of those may be mapped to different additional offsets to be added to the $TA_d$ for transmission of MSG 3. Further, the offsets of each frequency/time combination may be broadcast such that the users may have access to them beforehand. This may be, for example, transmitted in an NTN-specific system information block (SIB).

In an alternative embodiment, the time-frequency allocation of MSG 2 on the physical downlink shared channel (PDSCH) (physical resource block (PRB) and slot) may be used as an implicit indication of the differential additional offset. Further, this embodiment may apply to 2-step RACH since the time-frequency allocation of the network-originated message (MSG B) may implicitly indicate the timing advance offset.

According to another example embodiment, implicit allocation of $TA_d$ offsets for MSG 3 may be achieved via downlink control information (DCI) allocation of RAR (MSG 2). For example, the provided TA may be split into two parts. One part may be carried over in the DCI message scheduling the RAR (transmitted on physical downlink control channel (PDCCH)), and another part may follow the same format as before within the RAR. In addition, the DCI that provides the pointer for the PDSCH conveying the RAR MSG 2 for the UE, contains 16 reserved bits. In addition, the use of the DCI (pointing to the PDSCH allocation of MSG B) may also be applicable to 2-step RACH. Thus, it may be possible to utilize some of these reserved bits readily available in the DCI and without needing to introduce a new DCI size (i.e., these reserved bits may be used to indicate to the UE the additional $TA_d$ offset to be applied in the TA for the transmission of MSG 3).

Under DCI allocation of RAR, the UE may know in advance that the DCI may be interpreted that the reserved bits are no longer reserved, but used to carry part of the TA). This may be achieved by adding an extra parameter to the system information, or based on some other information that tells the UE that the cell in question is served by a satellite (or other extended range) base station, such as a network identity code or some other parameters attributed to such cells.

According to another example embodiment, implicit allocation of $TA_d$ offsets for MSG 3 may be accomplished by way of assigning multiple ra-responseWindow timers. In this case, each of the ra-responseWindows may be assigned to a different $TA_d$ offset value to be applied in the TA for the transmission of MSG 3.

In a further example embodiment, implicit allocation of $TA_d$ offsets for MSG 3 may be accomplished by assigning different $TA_d$ to different ranges of temporary cell radio network temporary identifier (T-CRNTI). In this solution, together with the $TA_d$ and the UL grant, the RAR messages may also assign a T-CRNTI to the user. This value may be used to attribute different $TA_d$ offsets for different ranges of allowed T-CRNTI values. Further, in other example embodiments, the use of different T-CRNTI may apply to 2-step RACH (e.g., the network may provide it in MSG B).

In an example embodiment of the above-described solutions, it may be assumed that the example of a NTN cell is configured with an SCS of 30 kHz, and with a size corresponding to a maximum differential delay of 3 ms, which is close to the maximum allowed value of 3.2 ms. According to an example embodiment, the maximum differential TA between two users in this cell may be as high as 6 ms.

From Table 2, it may be possible to see that the maximum $TA_d$ that may be conveyed in such cases by the RAR command is 1 ms. Thus, even if the UE closest to the gNB is this cell has a $TA_d$ equal to 0 (due to the use of the common TA delay), the maximum range allowed by the RAR command cannot cover the full cell. Accordingly, other users in the interval 1-6 ms may not be synchronized.

As previously noted, one solution for implicitly signaling the $TA_d$ offset to the UE may include a time/frequency dependent offset, according to certain example embodiments. According to an example embodiment, the time/frequency dependent offset may provide a frequency dependent offset and a time dependent offset. Under the frequency dependent offset, besides the $TA_d$, the RAR (MSG 2) may also provide the UL grant for MSG 3. However, according to certain example embodiments, the specific time/frequency allocation (e.g. a group of time/frequency combinations or a subgroup of time/frequency combinations) of the UL grant for MSG 3 may define $TA_d$ to use for transmission of MSG 3. According to an example embodiment, MSG 2 has 14 bits indicating the frequency resource allocation, and 4 bits indicating the time allocation.

In an example embodiment, the frequency allocation is defined by the 14 bits, and follows the procedure described in clause 6 in 3GPP TS 38.214. Further, the 14 bits may be mapped into a resource indication value (RIV), which represents a unique number that defines the starting resource bock ($RB_{start}$) and the length of the allocation ($L_{RBs}$). According to an example embodiment, the mapping of ($RB_{start}$) and ($L_{RBs}$) from the RIV may follow the following formula:

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs}+1) + (N_{BWP}^{size} - 1 - RB_{start})$ where $L_{RBs} \geq 1$ and shall not exceed $N_{bWP}^{size} - RB_{start}$.

In the above formula, $N_{BWP}^{size}$ is the size of the bandwidth part in PRBs. To maintain the RAR format constant, regardless of the bandwidth, the 14 bits may be kept for all bandwidth sizes. This truncates the assignment if the bandwidth part exceeds 180 PRBs or considering just a subset of the 14 bits if the bandwidth part is much smaller.

Figure 6:
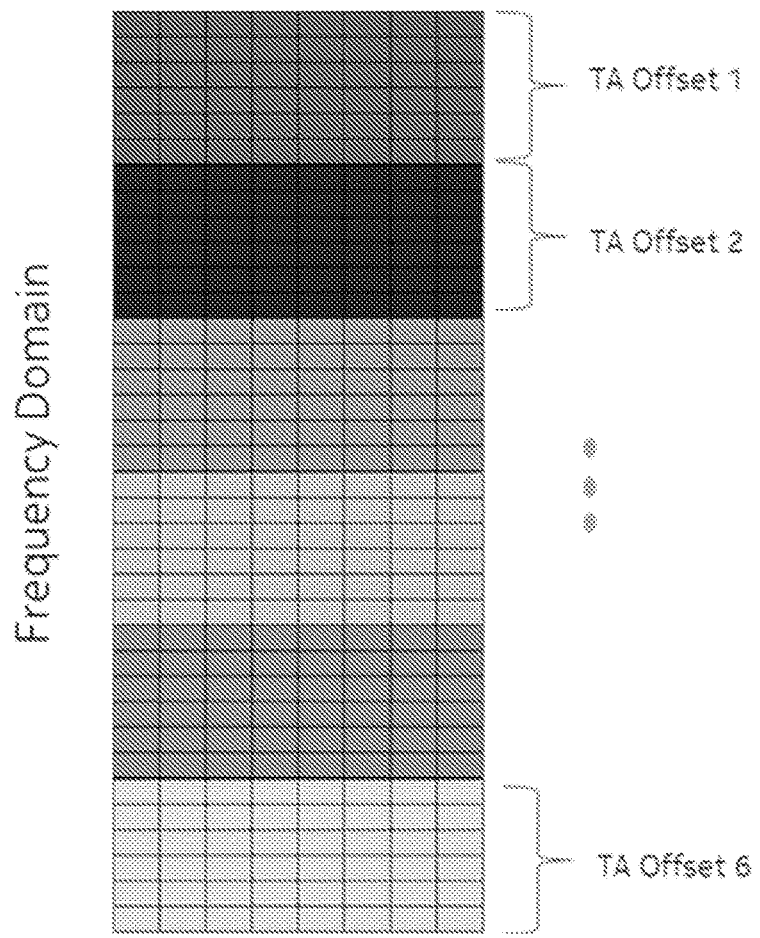
FIG. 6 illustrates a frequency domain assignment of timing advance offsets, according to an example embodiment.

According to an example embodiment, the frequency domain assignment may be mapped into different $TA_d$ offsets. For instance, in the above example, the TA range may be expanded six times. In an example embodiment, this may be achieved by assigning a different offset for different RB start positions, as illustrated in FIG. 6. In particular, FIG. 6 illustrates an example of a frequency domain assignment of $TA_d$ offsets, according to an example embodiment. In this example, $TA_d$ offset 1 may be 0 ms, $TA_d$ offset 2 may be 1 ms, and $TA_d$ offset 3 may be 2 ms and so forth.

In certain example embodiments, by knowing the position of the $RB_{start}$, the UE may directly determine the $TA_d$ offset to be applied in addition to the $TA_d$ in the RAR command, which may expand the total range to the required 6 ms. Thus, according to certain example embodiments, the $RB_{start}$ may define the $TA_d$ offset, and not the endpoint (in terms of PRBs) of the allocation.

According to certain example embodiments, additional observations may be made with the frequency dependent offset. In particular, the $TA_d$ offset to be applied may be broadcast beforehand to the UEs. For example, the gNB may signal the number of offset groups and the offset size for each group. According to another example embodiment, a few subsets of the frequency domain may be related to an offset. Additionally, other example embodiments may be used in combination with a scaling factor, and instead of the frequency domain, the partition may occur in the RIV domain. In another example embodiment, the offset groups may not have the same size due to the user distribution in the cell, which may vary, and MSG 3 allocations may be needed.

As previously noted, the time/frequency dependent offset may also provide a time dependent offset. In one example embodiment, in the same UL grant for MSG 3, the RAR may also provide a time domain assignment. In particular, the four bits are mapped into a 16-row table as defined in 3GPP TS 38.214 (Table 3). As illustrated in Table 3, K2 may correspond to the offset in time slots, S may correspond to the starting OFDM symbol, and L may correspond to the length in the number of OFDM symbols. In addition, some indexes in Table 3 may be associated to different $TA_d$ offsets. Further, in an example embodiment, the different $TA_d$ offsets may be associated to a combination of RIV in the frequency domain, and the row index of the time domain allocation table, extending the possibilities for offset ranges.

TABLE 3

Time Domain allocation mapping indexes as defined in 3GPP TS 38.214

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

As previously noted, another solution for implicitly signaling the $TA_d$ offset to the UE may include DCI allocation of RAR (MSG 2), according to certain example embodiments. According to this solution, 16 bits are reserved in the DCI scheduling the RAR (MSG 2) in DL. The information that may be transmitted by means of the DCI format 1_0 with cyclic redundancy check (CRC) scrambled by RA-RNTI may include: frequency domain resource assignment—$\lceil \log_2(N_{RB}^{DL,BWP}(N_{RB}^{DL,BWP}+1)/2) \rceil$ bits; $N_{RB}^{DL,BWP}$ is the size of CORESET 0 if CORESET 0 is configured for the cell and $N_{RB}^{DL,BWP}$ is the size of the initial DL bandwidth part if CORESET 0 is not configured for the cell; time domain resource assignment—4 bits; VRB-to-PRB mapping—1 bit; modulation and coding scheme—5 bits; TB scaling—2 bits; and reserved bits—16 bits.

According to certain example embodiments, these bits, or a subset of them, may be used by the gNB to inform the UE about the $TA_d$ range format contained in the RAR. One example is shown in Table 4 that includes various offsets in TA range format conveyed by MSG 2. That is, in certain example embodiments, a subset of the reserved DCI bits may be interpreted as indicating that the content of the RAR message had the TA command offset by X ms. For instance, one implementation may include assigning the first 4 bits to indicate how the next 12 bits are to be interpreted. Then, for example, the first bits set to 1010 may indicate that the following 12 bits are to be decoded as additional NTN specific parameters. Further, within the 12 bits, the first 2 bits, for example, may be set as 00 to indicate that the following 10 bits represent $TA_d$ offset values, according to Table 4. This may leave room for several uses, not necessarily TA or NTN related, of the currently available spare bits.

TABLE 4

Table of offset in TA range format conveyed by MSG2 according to an example embodiment

| Index on the TA offset bits | Min TA Range | Max TA RANGE |
|---|---|---|
| 0 | 0 | 1 ms |
| 1 | 1 ms | 2 ms |
| 2 | 2 ms | 3 ms |

TABLE 4-continued

Table of offset in TA range format conveyed by MSG2
according to an example embodiment

| Index on the TA offset bits | Min TA Range | Max TA RANGE |
|---|---|---|
| 3 | 3 ms | 4 ms |
| 4 | 4 ms | 5 ms |
| 5 | 5 ms | 6 ms |

Under DCI allocation of RAR, certain example embodiments may provide backwards compatibility that does not require additional signaling creation. Instead, it may require the NTN users, and only those, to interpret these bits. In addition, there may be no need of explicit signaling of which offset to apply between consecutive intervals as the offset index of P may correspond to P times the maximum delay allowed for that subcarrier spacing in legacy procedures. According to an example embodiment, the up to 16 bits may be used to apply an additional offset in the time between the DCI scheduling MSG 2 and the MSG 2. In an example embodiment, this delay may be added later to MSG 3. Although this operation may introduce more delay, it may also reduce the number of cross-layer procedures. Additionally, for LEO scenarios, up to 6 bits may be enough to cover all possible cases.

Another example embodiment may provide a further solution for implicitly signaling the $TA_d$ offset to the UE and may and include assigning multiple ra-responseWindow timers, according to certain example embodiments. Here, implicitly assigning $TA_d$ offset may be accomplished by using multiple ra-responseWindow timers. In this case, the gNB may signal the common values for the ra-responseWindow (up to 10 ms) to the UE, and broadcast a multiplying factor, M. In an example embodiment, the UE may wait for a RAR response for a total time that equals M*ra-responseWindow.

Figure 7:
FIG. 7 illustrates multiple ra-responseWindows of equal size configured over a period of M*ra-responseWindow, according to an example embodiment.

FIG. 7 illustrates multiple ra-responseWindows of equal size configured over a period of M*ra-responseWindow, according to an example embodiment. In an example embodiment, from the UE perspective, the total window may be split into M regions of duration equal to the original ra-responseWindow, as illustrated in FIG. 7. According to an example embodiment, if the RAR arrives at the UE over the $1^{st}$ window, then the minimum $TA_d$ offset (i.e., 0) may be applied to the TA. If MSG 2 arrives at the second window, then a $TA_d$ offset equal to the maximum TA delay may be applied on top of the TA command and so on for the next ra-responseWindow.

According to certain example embodiments, due to the large differential delays, the different ra-responseWindow offsets may be covered by the round trip time (RTT) between the UE and gNB. In addition, an offset may be assigned to a TA value depending on how the estimated RTT affects the RAR reception time. Further, in an example embodiment, the $TA_d$ offset corresponding to different receiving times for the RAR may be implicit or explicit in a broadcast message. However, in other example embodiments, the mapping may be possible when one or more restrictions are in place about which TC-RNTI values the UE can be assigned. For instance, instead of using a mapping based on all 16 bits, a mapping using only some of the bits can be considered (e.g., the least (most) significant 3 bits, etc.).

As previously noted, another solution for implicit signaling the $TA_d$ offset to the UE may include assigning different $TA_d$ offset values to different ranges of T-CRNTI, according to certain example embodiments. According to certain example embodiments, the UE identifier transmitted by the network may include the offset. Further, the T-CRNTI may be one example of an identifier, and the one that is commonly used in 5G in this stage of the connection. However, in other example embodiments, other identifiers may be used in a different context.

In an example embodiment, the temporary C-RNTI, assigned by the RAR, may assume hexadecimal values in the 0001-FFEF. As such, it may be possible to define subsets of this range of values to different $TA_d$ offsets. This may be illustrated via Table 5, which provides an example of such division for the reference scenario described herein.

TABLE 5

Table of offset in TA range format conveyed by MSG2 according
to an example embodiment for different temporary C-RNTIs

| Offset Group Index | Temporary C-RNTI range | Min TA Range | Max TA RANGE |
|---|---|---|---|
| 0 | 0001-2AA8 | 0 | 1 ms |
| 1 | 2AA9-5550 | 1 ms | 2 ms |
| 2 | 5551-7FF8 | 2 ms | 3 ms |
| 3 | 7FF9-AAA0 | 3 ms | 4 ms |
| 4 | AAA1-D548 | 4 ms | 5 ms |
| 5 | D459-FFEF | 5 ms | 6 ms |

From Table 5, it may be observed that low additional signaling may be required as the network may need to broadcast the number of partitions and the offset between each partition. Alternatively, to facilitate UE procedures the offset group indexes may be defined as a $mod_p (X)$, where P is the number of partitions signaled by the network, and X is the UE temporary C-RNTI.

Although certain solutions for implicitly signaling the TA, offset to the UE may be described herein, certain example embodiments may not be limited to such solutions, and other solutions may be provided by other example embodiments. For instance, in certain example embodiments, a combination of the solutions described herein may be used to minimize the additional signaling required as much as possible, while minimizing the potential drawbacks of any of the solutions. For example, scheduler assignments may be used in time and/or frequency, to inform the UE about $TA_d$ offsets to be applied in the transmission. However, this may limit the flexibility of the scheduler in certain scenarios. For instance, in the case of dense hotspots (e.g., cruise ships), there may be many attempts to establish connections. However, resources may be limited where the gNB may schedule the MSG 3 of the users. The same may be true when assigning different $TA_d$ offsets to different ranges of T-CRNTI if several C-RNTIs are already in use in a given instant of time.

To minimize these challenges, certain example embodiments may combine the time/frequency dependent offset solution with the solution of assigning different $TA_d$ offsets to different ranges of T-CRNTI. In this embodiment, the temporary C-RNTI may be used as a mapping function for the $TA_d$ presented in FIG. 6. For example, $Z=mod_p (X)$, may represent the number of circular shifts in the $TA_d$ offset resource in FIG. 6.

According to another example embodiment, uneven user density distributions (e.g., hotspot scenarios) may be handled by allowing the mappings provided in the time/frequency dependent offset solution and the solution of assigning different $TA_d$ offsets to different ranges of T-CRNTI to also be unevenly distributed (different frequency/time partitions or different subset sizes for the temporary C-RNTI). According to certain example embodiments, this assignment may also dynamically change over time by updating the information broadcasted to the UEs.

In another example embodiment, certain ra-ssb-Occasion-MaskIndex values (defines physical random access channel (PRACH) occasion(s) associated with a synchronization signal block (SSB) in which the medium access control (MAC) entity may transmit a random access preamble; available for both contention based RACH (CBRA) and contention-free RACH (CFRA)) may be used to map to the different $TA_d$ values. In an example embodiment, this configuration may be known by the UE before the PRACH sequence is transmitted. Thus, it may be used in combination with any of the solutions described herein as a default setting, or as an indication of additional TA to be added to the values signaled via the solutions described herein. According to another example embodiment, in a situation where not all the PRACH occasions are being used, the out-of-range occasions indicated by the ra-ssb-Occasion-MaskIndex may be assigned to indicate $TA_d$.

Figure 8:
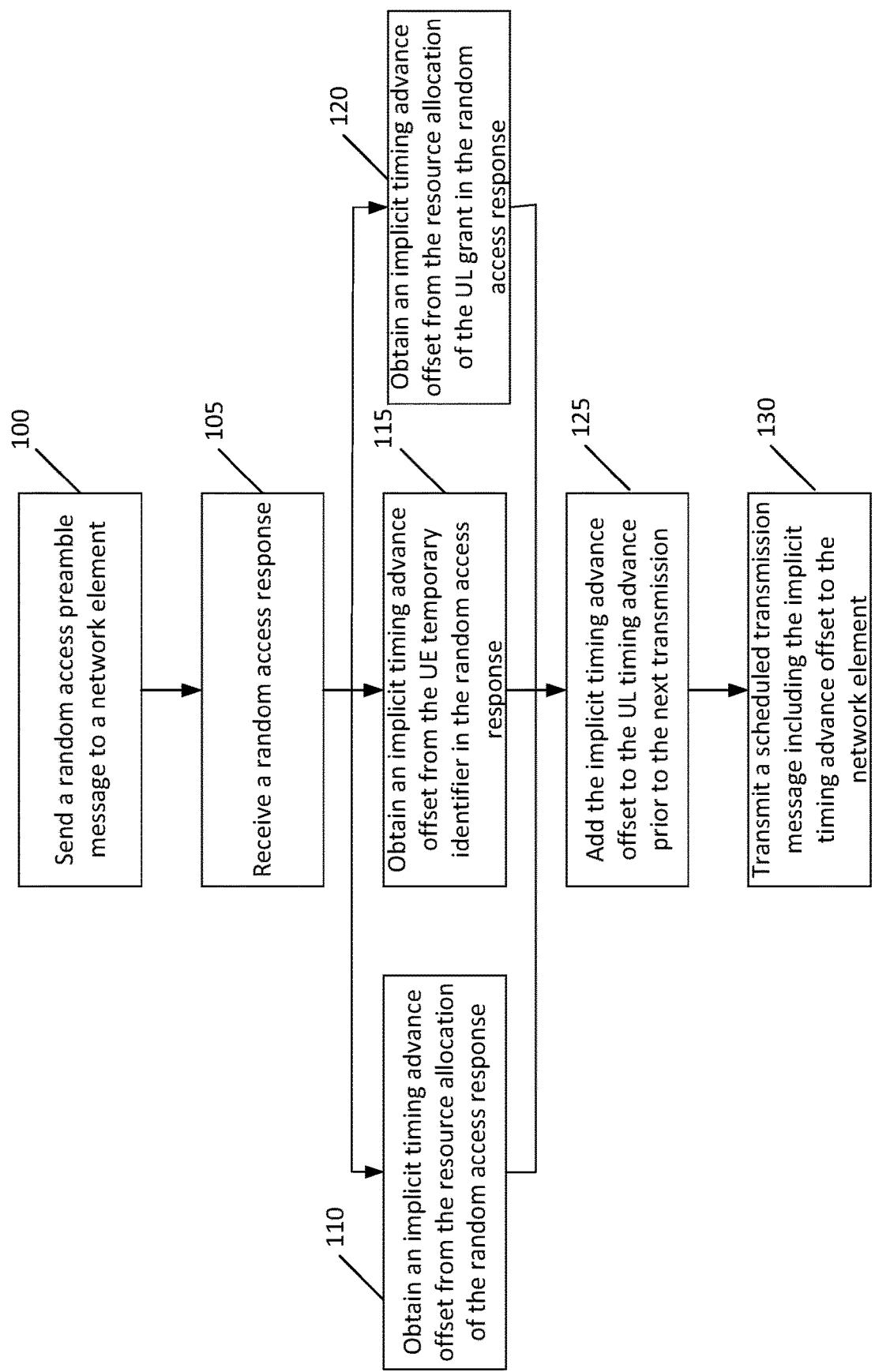
FIG. 8 illustrates a flow diagram of another method, according to an example embodiment.

FIG. 8 illustrates a flow diagram of a method, according to an example embodiment. In certain example embodiments, the flow diagram of FIG. 8 may be performed by a mobile station and/or UE, for instance similar to apparatus 10 illustrated in FIG. 10(a). According to one example embodiment, the method of FIG. 8 may include initially, at 100, sending, by a UE, a random access preamble message to a network element. The method may also include, at 105, receiving an UL grant in a random access response message in response to the random access preamble message. Further, the method may include, at 110, obtaining an implicit timing advance offset from the resource allocation of the random access response. The method may also include, at 115, obtaining an implicit timing advance offset from the UE temporary identifier in the random access response. In addition, the method may include at 120, obtaining an implicit timing advance offset from the resource allocation of the UL grant in the random access response. Further, in addition to steps 110, 115, and 120, other embodiments, as defined herein, may be used to obtain the timing advance offset. At 125, the method may include adding an implicit timing advance offset to an UL time domain resource allocation of the UL grant to establish synchronization of radio transmissions between the UE and the network element. In addition, at 130, the method may include transmitting a scheduled transmission message including the implicit timing advance offset to the network element. In an example embodiment, the implicit timing advance offset may be added to the UL time domain resource before the scheduled transmission message is transmitted.

In an example embodiment, the method may include receiving from the network element, a common value for a ra-responseWindow associated with the implicit timing advance offset. In addition, the method may include receiving from the network element, a temporary cell radio network temporary identifier associated with the implicit timing advance offset to attribute different timing advance offsets for different ranges of allowed temporary cell radio network temporary identifier values. In an example embodiment, the temporary cell radio network temporary identifier may be received depending on at least one restriction.

In an example embodiment, the implicit timing advance offset is added to the UL time domain resource before the scheduled transmission message is transmitted. In another example embodiment, the UL grant may include a combination of a frequency allocation and a time allocation, and the combination may be mapped to an additional timing advance offset to be added in the scheduled transmission message. According to another example embodiment, the mapping between the combination and the timing offset may be received in a network-specific signal information block. In a further example embodiment, the combination may be received on a physical downlink shared channel as an implicit indication of the additional timing advance offset.

Figure 9:
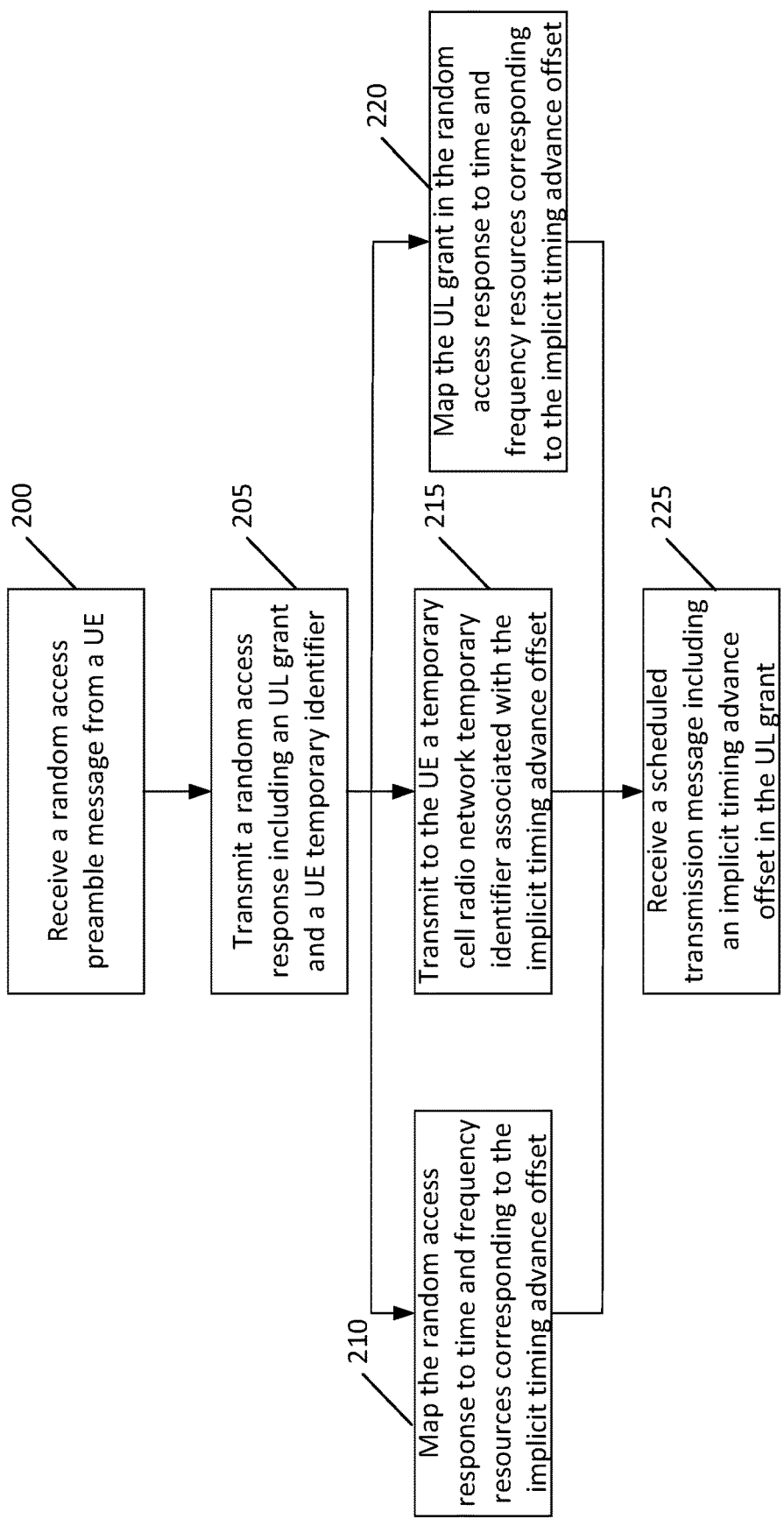
FIG. 9 illustrates a flow diagram of another method, according to an example embodiment.

FIG. 9 illustrates a flow diagram of another method, according to an example embodiment. In an example embodiment, the method of FIG. 9 may be performed by a telecommunications network, network entity or network node in a 3GPP system, such as LTE or 5G-NR. For instance, in an example embodiment, the method of FIG. 9 may be performed by a base station, eNB, or gNB, MCG, SCG, PCell, or PSCell for instance similar to apparatus 20 illustrated in FIG. 10(b).

According to an example embodiment, the method of FIG. 9 may include initially, at 200, receiving, at network element, a random access preamble message from a UE. The method may also include, at 205, transmitting a random access response message including an UL grant in response to the random access preamble message. In addition, at 210, map the random access response to time and frequency resources corresponding to the implicit timing advance offset. At 215, the method may further include transmitting to the UE a temporary cell radio network temporary identifier associated with the implicit timing advance offset. Further, at 220, the method may include mapping the UL grant in the random access response to time and frequency resources corresponding to the implicit timing advance offset. The method may also include, at 225, receiving a scheduled transmission message including an implicit timing advance offset in the UL grant to establish synchronization of radio transmissions between the network element and the user equipment. In addition to the steps illustrated in FIG. 9, other example embodiments as defined herein, may be used to obtain the timing advance offset.

In an example embodiment, the method may further include mapping a common value for a ra-responseWindow associated with the implicit timing advance offset. Additionally, the temporary cell radio network temporary identifier associated with the implicit timing advance offset is transmitted to attribute different timing advance offsets for different ranges of allowed temporary cell radio network temporary identifier values. In an example embodiment, the temporary cell radio network temporary identifier may be transmitted depending on at least one restriction.

According to an example embodiment, the UL grant may include a combination of a frequency allocation and a time allocation, and the combination may be mapped to an additional timing advance offset to be added in the scheduled transmission message. In another example embodiment, the combination and the timing advance offset may be transmitted in a network-specific signal information block. In a further example embodiment, the combination may be transmitted on a physical downlink shared channel as an implicit indication of the additional timing advance offset.

Figure 10A:
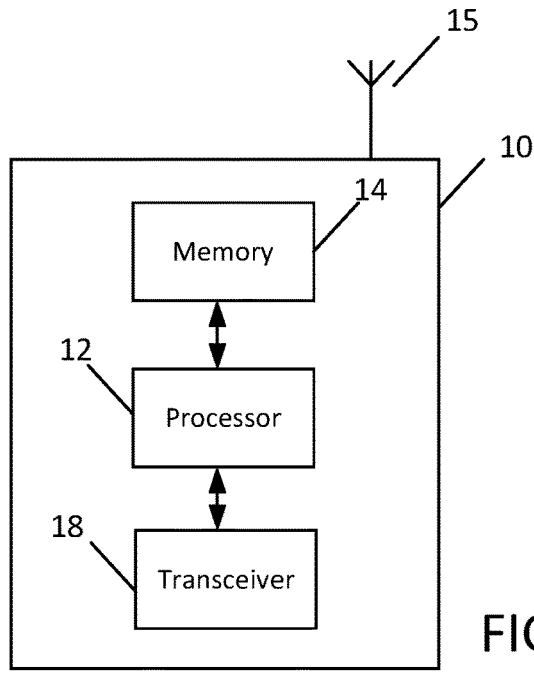
FIG. 10(a) illustrates an apparatus, according to an example embodiment.

FIG. 10(a) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 10(a).

As illustrated in the example of FIG. 10(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10(a), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-8.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to send a random access preamble message to a network element. Apparatus 10 may also be controlled by memory 14 and processor 12 to receive an uplink grant in a random access response message in response to the random access preamble message. Apparatus 10 may further be controlled by memory 14 and processor 12 to add an implicit timing advance offset to an uplink time domain resource allocation of the uplink grant to establish synchronization of radio transmissions between the apparatus and the network element. In addition, apparatus 10 may be controlled by memory 14 and processor 12 to transmit a scheduled transmission message including the implicit timing advance offset to the network element. Further, apparatus 10 may be controlled by memory 14 and processor 12 to receive from the network element, a common value for a ra-response-Window associated with the implicit timing advance offset. Apparatus 10 may further be controlled by memory 14 and processor 12 to receive from the network element, a temporary cell radio network temporary identifier associated with the implicit timing advance offset to attribute different timing advance offsets for different ranges of allowed temporary cell radio network temporary identifier values.

Figure 10B:
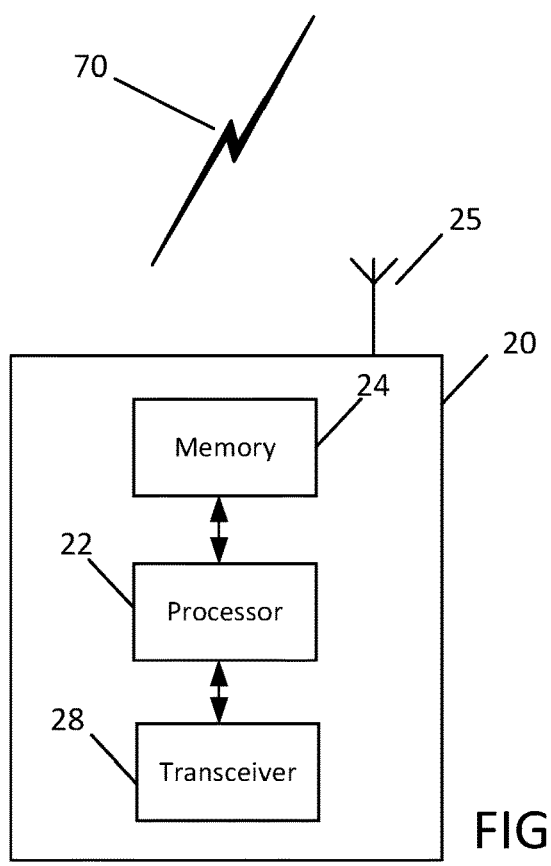
FIG. 10(b) illustrates another apparatus, according to an example embodiment.

FIG. 10(b) illustrates an apparatus 20 according to an example embodiment. In an example embodiment, the apparatus 20 may be a RAT, node, host, or server in a communication network or serving such a network. For example, apparatus 20 may be a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 10(b).

As illustrated in the example of FIG. 10(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-7 and 9.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-7 and 9.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware.

The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to receive a random access preamble message from a user equipment. Apparatus 20 may also be controlled by memory 24 and processor 22 to transmit a random access response message including an uplink grant in response to the random access preamble message. In addition, apparatus 20 may be controlled by memory 24 and processor 22 to receive a scheduled transmission message including an implicit timing advance offset in the uplink grant to establish synchronization of radio transmissions between the network element and the user equipment. Further, apparatus 20 may be controlled by memory 24 and processor 22 to transmit a common value for a ra-responseWindow associated with the implicit timing advance offset. Apparatus 20 may also be controlled by memory 24 and processor 22 to transmit to the user equipment a temporary cell radio network temporary identifier associated with the implicit timing advance offset to attribute different timing advance offsets for different ranges of allowed temporary cell radio network temporary identifier values Certain example embodiments described herein provide several technical improvements, enhancements, and/or advantages. In some example embodiments, it may be possible to ensure that the propagation delay differences between different UEs are compensated so that it may be possible to time-multiplex different UEs without the tail of one UE's transmission to overlap with the start of another UE's transmission. It may also be possible to extend the range of differential TA, the individual value of timing advance that is signaled to the UEs to indicate the differential delay to be compensated. It may also be possible to extend the range of values for the differential TA in the RAR message that needs to be extended to cover all possible user locations within a cell.

According to other embodiments, it may be possible to broadcast the offsets of each frequency/time combination such that the users can have access to them beforehand. It may also be possible to extend the DCI scheduling RAR to carry (common) part of the timing advance so that the reserved bits may be used to indicate to the UE the additional $TA_d$ offset to be applied in the TA for the transmission of MSG 3. In another example embodiment, it may be possible to avoid explicit signaling of which offset to apply between consecutive intervals. It may also be possible to achieve backward compatibility where additional signaling creation is not required. In addition, it may be possible to reduce the requirements for the $TA_d$ range to be signaled in the RAR.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

CRC Cyclic Redundancy Check
DCI Downlink Control Information
DL Downlink
eNB Enhanced Node B
gNB 5G or NR Base Station
LTE Long Term Evolution
NTN Non-Terrestrial Network
NR New Radio
PRACH Physical Random Access Channel
RACH Random Access Channel
RAR Random Access Response
RIV Resource Indication Value RTT Real-time Text
SCS Sub-carrier Spacing
TA Timing Advance
TDD Time Division Duplex
UE User Equipment
UL Uplink A first embodiment is directed to a method that may include sending, by a user equipment, a random access preamble message to a network element. The method may also include receiving an uplink grant in a random access response message in response to the random access preamble message. The method may further include, adding an implicit timing advance offset to an uplink time domain resource allocation of the uplink grant to establish synchronization of radio transmissions between the user equipment and the network element. In addition, the method may include transmitting a scheduled transmission message including the implicit timing advance offset to the network element.

In a variant, the implicit timing advance offset may be added to the uplink time domain resource before the scheduled transmission message is transmitted.

In a variant, the uplink grant may include a combination of a frequency allocation and a time allocation, and the combination may be mapped to an additional timing advance offset to be added in the scheduled transmission message.

In a variant, the combination and the timing advance offset may be received in a network-specific signal information block.

In a variant, the combination may be received on a physical downlink shared channel as an implicit indication of the additional timing advance offset.

In a variant, the random access response message may include a timing advance command, and the timing advance command may be split into two parts.

In a variant, the method may also include receiving from the network element, a common value for a ra-responseWindow associated with the implicit timing advance offset.

In a variant, the method may further include receiving from the network element, a temporary cell radio network temporary identifier associated with the implicit timing advance offset to attribute different timing advance offsets for different ranges of allowed temporary cell radio network temporary identifier values.

In a variant, the temporary cell radio network temporary identifier may be received depending on at least one restriction.

A second embodiment may be directed to a method that may include receiving, at network element, a random access preamble message from a user equipment. The method may also include transmitting a random access response message including an uplink grant in response to the random access preamble message. The method may further include receiving a scheduled transmission message including an implicit timing advance offset in the uplink grant to establish synchronization of radio transmissions between the network element and the user equipment.

In a variant, the uplink grant may include a combination of a frequency allocation and a time allocation, and the combination may be mapped to an additional timing advance offset to be added in the scheduled transmission message.

In a variant, the combination and the timing advance offset may be transmitted in a network-specific signal information block.

In a variant, the combination may be transmitted on a physical downlink shared channel as an implicit indication of the additional timing advance offset.

In a variant, the random access response message may include a timing advance command, and the timing advance command may be split into two parts.

In a variant, the method may also include transmitting a common value for a ra-responseWindow associated with the implicit timing advance offset.

In a variant, the method may further include transmitting to the user equipment a temporary cell radio network temporary identifier associated with the implicit timing advance offset to attribute different timing advance offsets for different ranges of allowed temporary cell radio network temporary identifier values.

In a variant, the temporary cell radio network temporary identifier may be transmitted depending on at least one restriction.

Another embodiment is directed to an apparatus including at least one processor and at least one memory including computer program code. The at least one memory and the computer program code may be configured, with the at least one processor, to cause the apparatus at least to perform the method according to the first embodiment or the second embodiment or any of their variants discussed above.

Another embodiment is directed to an apparatus that may include circuitry configured to perform the method according to the first embodiment or the second embodiment or any of their variants.

Another embodiment is directed to an apparatus that may include means for performing the method according to the first embodiment or the second embodiment or any of their variants.

Another embodiment is directed to a computer readable medium including program instructions stored thereon for performing at least the method according to the first embodiment or the second embodiment or any of their variants.

The invention claimed is:

1. A method, comprising:
   sending, by a user equipment, a random access preamble message to a network element;
   receiving an uplink grant in a random access response message in response to the random access preamble message, wherein the uplink grant includes a combination of a frequency allocation and a time allocation;
   determining an implicit timing advance based on the combination of the frequency allocation and the time allocation;
   adding the implicit timing advance offset to an uplink time domain resource allocation of the uplink grant to establish synchronization of radio transmissions between the user equipment and the network element, wherein the implicit timing advance offset is added to the uplink time domain resource before the scheduled transmission message is transmitted; and
   transmitting a scheduled transmission message including the implicit timing advance offset to the network element, wherein the combination of the frequency allocation and the time allocation is mapped to an additional timing advance offset to be added in the scheduled transmission message.

2. The method according to claim 1, wherein the combination and the timing advance offset is received in a network-specific signal information block.

3. The method according to claim 1, wherein the combination is received on a physical downlink shared channel as an implicit indication of the additional timing advance offset.

4. The method according to claim 3, wherein, the random access response message includes a timing advance command, and the timing advance command is split into two parts.

5. The method according to claim 4, further comprising receiving from the network element, a common value for a ra-response Window associated with the implicit timing advance offset.

6. The method according to claim 5, further comprising receiving from the network element, a temporary cell radio network temporary identifier associated with the implicit timing advance offset to attribute different timing advance offsets for different ranges of allowed temporary cell radio network temporary identifier values.

7. The method according to claim 6, wherein the temporary cell radio network temporary identifier is received depending on at least one restriction.

8. A method, comprising:
receiving, at a network element, a random access preamble message from a user equipment;
transmitting a random access response message including an uplink grant in response to the random access preamble message;
receiving a scheduled transmission message including an implicit timing advance offset in the uplink grant to establish synchronization of radio transmissions between the network element and the user equipment.

9. An apparatus, comprising,
at least one processor, and
at least one memory including computer program code, and the at least one memory and the computer program code being configured, with the at least one processor, to cause the apparatus at least to:
send a random access preamble message to a network element;
receive an uplink grant in a random access response message in response to the random access preamble message, wherein the uplink grant includes a combination of a frequency allocation and a time allocation;
determining an implicit timing advance based on the combination of the frequency allocation and the time allocation;
add the implicit timing advance offset to an uplink time domain resource allocation of the uplink grant to establish synchronization of radio transmissions between the apparatus and the network element, wherein the implicit timing advance offset is added to the uplink time domain resource before the scheduled transmission message is transmitted; and
transmit a scheduled transmission message including the implicit timing advance offset to the network element, wherein the combination of the frequency allocation and the time allocation is mapped to an additional timing advance offset to be added in the scheduled transmission message.

10. The apparatus according to claim 9, wherein the combination and the timing advance offset is received in a network-specific signal information block.

11. The apparatus according to claim 9, wherein the combination is received on a physical downlink shared channel as an implicit indication of the additional timing advance offset.

12. The apparatus according to claim 11, wherein, the random access response message includes a timing advance command, and the timing advance command is split into two parts.

13. The apparatus according to claim 12, the at least one memory and the computer program code being further configured, with the at least one processor, to cause the apparatus to receive from the network element, a common value for a ra-responseWindow associated with the implicit timing advance offset.

14. The apparatus according to claim 13, the at least one memory and the computer program code being further configured, with the at least one processor, to cause the apparatus to receive from the network element, a temporary cell radio network temporary identifier associated with the implicit timing advance offset to attribute different timing advance offsets for different ranges of allowed temporary cell radio network temporary identifier values.

15. The apparatus according to claim 14, wherein the temporary cell radio network temporary identifier is received depending on at least one restriction.

16. An apparatus comprising:
at least one processor, and
at least one memory including computer program code, and the at least one memory and the computer program code being configured, with the at least one processor, to cause the apparatus at least to:
receive a random access preamble message from a user equipment;
transmit a random access response message including an uplink grant and a differential timing advance in response to the random access preamble message;
receive a scheduled transmission message including an implicit timing advance offset added to an uplink time domain resource of the uplink grant before the scheduled transmission message is transmitted to establish synchronization of radio transmissions between the apparatus and the user equipment,
wherein the uplink grant includes a combination of a frequency allocation and a time allocation, and the combination is mapped to an additional timing advance offset to be added in the scheduled transmission message.

17. A computer program embodied on a non-transitory computer-readable medium, said computer program comprising program instructions which, when executed in hardware, cause the hardware to perform the method according to claim 1.

* * * * *